United States Patent
Nakamikawa

(10) Patent No.: US 10,126,463 B2
(45) Date of Patent: Nov. 13, 2018

(54) LIVING BODY DETECTOR AND POWER-SAVING MODE SETTING METHOD

(71) Applicant: ASAHI KASEI MICRODEVICES CORPORATION, Tokyo (JP)

(72) Inventor: Kyoya Nakamikawa, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 855 days.

(21) Appl. No.: 14/415,831

(22) PCT Filed: Jun. 3, 2014

(86) PCT No.: PCT/JP2014/002956
§ 371 (c)(1),
(2) Date: Jan. 20, 2015

(87) PCT Pub. No.: WO2014/199594
PCT Pub. Date: Dec. 18, 2014

(65) Prior Publication Data
US 2015/0168595 A1  Jun. 18, 2015

(30) Foreign Application Priority Data
Jun. 12, 2013  (JP) .................. 2013-124019

(51) Int. Cl.
*H01H 37/00*  (2006.01)
*G01V 9/00*  (2006.01)
(Continued)

(52) U.S. Cl.
CPC .......... *G01V 9/005* (2013.01); *G01J 5/0025* (2013.01); *G06F 1/3203* (2013.01);
(Continued)

(58) Field of Classification Search
CPC .. G01V 9/005; G01V 9/00; G01V 8/10; G01J 5/0025; G06F 1/3203; G06F 1/3206; G06F 1/3231; Y10T 307/773; Y02B 60/1289
(Continued)

(56) References Cited

U.S. PATENT DOCUMENTS

| | | | |
|---|---|---|---|
| 2003/0197597 A1* | 10/2003 | Bahl ..................... | G06F 1/3203 340/7.58 |
| 2006/0140452 A1* | 6/2006 | Raynor ................. | G06F 1/3203 382/115 |
| 2014/0186215 A1 | 7/2014 | Shinta et al. | |

FOREIGN PATENT DOCUMENTS

| | | |
|---|---|---|
| JP | H11-006764 A | 1/1999 |
| JP | 2008-298602 A | 12/2008 |

(Continued)

OTHER PUBLICATIONS

International Search Report dated Aug. 12, 2014 for International Application No. PCT/JP2014/002956.
(Continued)

*Primary Examiner* — Hal Kaplan
(74) *Attorney, Agent, or Firm* — Morgan, Lewis & Bockius LLP

(57) ABSTRACT

The state of an object such as a presence or absence of the object in a sensor visual field is detected with accuracy. For this end, a DC output Sdc that is a direct current component of a temperature sensor output value S is operated. Based on this, a fluctuation level representing whether a fluctuation is caused by a user or someone else who passes by is acquired. When the DC output Sdc is lower than a DC output threshold THdc, an absence determination counter is incremented when the fluctuation is not caused by either the user or the someone else who passes by, and the state of absence is determined when the absence determination counter reaches the upper limit. When the fluctuation is caused by either the user or someone else who passes by, the absence determination counter is reset.

8 Claims, 10 Drawing Sheets

(51) Int. Cl.
 *G06F 1/32* (2006.01)
 *G01J 5/00* (2006.01)
(52) U.S. Cl.
 CPC .......... *G06F 1/3206* (2013.01); *G06F 1/3231* (2013.01); *G01V 9/00* (2013.01); *Y02D 10/173* (2018.01); *Y10T 307/773* (2015.04)
(58) Field of Classification Search
 USPC ........................................................ 307/117
 See application file for complete search history.

(56) References Cited

FOREIGN PATENT DOCUMENTS

| | | |
|---|---|---|
| JP | 2010-176211 A | 8/2010 |
| JP | 2013-088290 A | 5/2013 |
| TW | 201305551 A1 | 2/2013 |

OTHER PUBLICATIONS

International Preliminary Report on Patentability dated Dec. 23, 2015, for the corresponding International application No. PCT/JP2014/002956.

* cited by examiner

PRIOR ART

LIVING BODY DETECTOR AND
POWER-SAVING MODE SETTING METHOD

TECHNICAL FIELD

The present disclosure relates to a living body detector configured to determine a state of a possible object present in a visual field of a sensor based on detection information of the sensor, and a power-saving mode setting method.

BACKGROUND ART

In a device such as a terminal device, in one technology, various techniques are proposed to avoid wasteful power consumption. For example, in some cases, users activate the terminal devices, but leave them untouched without use. There are proposals for a terminal device such that an unused state is detected by the terminal device so that the terminal device itself can be shifted to a power-saving mode.

In other words, a sensor such as an infrared sensor for detecting whether or not a user is present is provided so that the terminal device determines whether or not the user leaves the seat and is away from the seat based on the detection signal of this sensor. When such a state of absence is detected, a method of processing to power off the screen of the display unit of the terminal device is proposed.

In addition, in a method of detecting whether or not a user is present based on whether or not the sensor value of the infrared sensor, for example, exceeds a threshold, even if the user is not present in fact, a wrong determination might be made that the user is present, when the sensor value exceeds the threshold according to a change in the temperature environment.

For this reason, there is a proposal of using an infrared detection element that outputs an absolute sensing signal. By use of the absolute sensing signal and differential sensing signal output from the infrared detection element, entering or exiting from the room is determined so as to avoid a wrong determination caused by a change in the temperature environment (for example, see PLT 1).

CITATION LIST

Patent Literature

PTL 1: JP H11-6764 A

SUMMARY OF INVENTION

Technical Problem

However, when the determination is made on whether or not the user is away from the terminal device in the above-described method of determining the entering or exiting from the room by use of the infrared detection element, even if someone else passes behind the seat while the user is away from the seat, a wrong determination may be made that the user is seated. Therefore, there is a demand for detecting whether or not the user is away from the seat with certainty.

Thus, the present disclosure has been made in view of the above circumstances, and has an object to provide a living body detector capable of detecting a state of a possible object present in a visual field with certainty such as a presence or absence of an object, and a power-saving mode setting method.

BRIEF DESCRIPTION OF DRAWINGS

FIGS. 5(a) to 5(c) illustrate an example of a fluctuation pattern in a temperature sensor output value caused by someone else who passes by;

DESCRIPTION OF EMBODIMENTS

Figure 1:
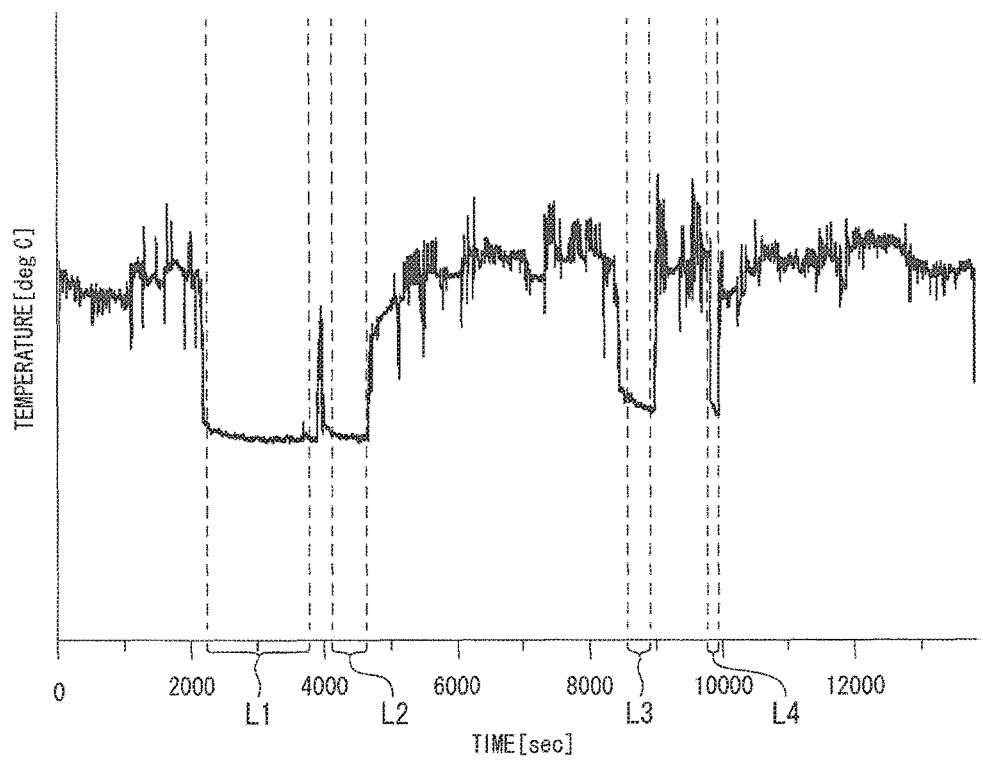
FIG. 1 is a waveform diagram illustrative of an example of a changing situation in an output value from a temperature sensor provided at a terminal device.

Hereinafter, some embodiments of the present disclosure will be described with reference to the drawings.

(Outline in Some Embodiments of the Present Disclosure)

In some embodiments of the present disclosure, a temperature sensor is configured to detect a state of an object. Specifically, the temperature sensor is configured to detect whether or not an object is present. Herein, descriptions will be given of a case where a living body detector (i.e., an information processing unit) in one embodiment of the present disclosure is applied to a terminal device to detect whether or not a user is present in front of a display unit included in the terminal device or in proximity of an external input device, that is, whether or not the user is seated in front of the terminal device and is in a state of using the terminal device. The living body detector in one embodiment of the present disclosure is configured to determine whether or not a living body (i.e., a user) is in a state of being able to use a device. In other words, the living body detector in one embodiment of the present disclosure is not limited to the case where the living body is seated in front of the terminal device in a visual field and is in the state of using the terminal device. Herein, the state of being able to use the terminal device means that, for example, a distance between with the living body and the device is the distance in which the living body is able to use the device. When the device is a personal computer or the like, the distance in which the living body is able to use the device is a distance between, for example, a personal computer and a place where the living body is seated, that is equal to or shorter than two meters. When the device is a smartphone, a mobile telephone, or the like, the distance in which the living body is able to use the device is, for example, equal to or smaller than one meter.

The temperature sensor is arranged at, for example, an upper part of the display unit of the terminal device to include a region where the user is present when the user is operating the terminal device in the visual field of the temperature sensor.

Also, as the temperature sensor, a temperature sensor such as an infrared sensor or the like is applicable. Instead of a thermal sensor of converting a temperature change, when it happens, caused by infrared absorption into an electrical signal, any temperature sensor is applicable as far as it is a quantum type configured to absorb infrared rays and output signals by photo-electric translation regardless of the temperature change, and is capable of detecting the temperature in the visual field in an absolute amount in non-contact. In addition, as the temperature sensor that is applicable, there are, for example, thermoelectromotive infrared sensors, conductive infrared sensors, photoconductive infrared sensors, photovoltaic infrared sensors, and the like.

Further, herein, a case of using a temperature sensor of detecting an absolute amount of the temperature will be described, but the present disclosure it is not limited to this. Any sensor capable of detecting biological information given by human in an absolute amount rather than a variation is applicable. As such a sensor, an active infrared sensor (emitting an infrared ray and measuring its reflection intensity or elapsed time) is applicable, and a distance sensor using a sound wave or electric wave is also applicable.

Herein, FIG. 1 illustrates a measurement result by a temperature sensor arranged at an upper part of a display unit included in a terminal device. The horizontal axis represents time, whereas the vertical axis represents temperature sensor output value, that is, average temperature in the visual field.

The temperature sensor is configured to include the front of the display unit of the terminal device and proximity of the external input device in the visual field. Thus, in FIG. 1, sections L1, L2, L3, and L4, in which the average temperatures are lower than other sections, represent a state where no human body is present. In other words, those sections can be considered that the user of the terminal device is away from the seat and in a state of absence.

Figure 2A:
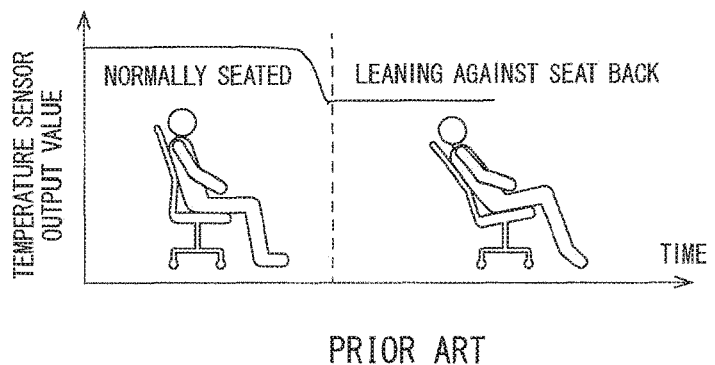
FIGS. 2A and FIG. 2B are views illustrative of a changing situation in the output value from the temperature sensor in accordance with a change in a seated manner.

As illustrated in, for example, FIG. 2A, however, when the user is seated and leaning against the seat back, a distance between the user and the temperature sensor become longer. Hence, even if the user is kept seated in fact, the average temperature detected by the temperature sensor may be lowered. In other words, as illustrated in the sections L1 to L4 of FIG. 1, the average temperatures lower than the other sections cannot be always considered to be the state of absence.

It is to be noted that when a user leaves the seat and is away from the seat (i.e., FIG. 2B), the decrease range of the temperature sensor output value is different. However, in a similar manner to the case where the user is leaning against the seat back, in the waveform, the temperature sensor output value steeply decreases and then becomes constant. In other words, it is impossible to determine whether the user is away from the seat or the user is leaning against the seat back, by only whether or not the output value from the temperature sensor decreases.

Now, referring back to FIG. 1, in the other sections except for the sections L1 to L4, that is while the user is in a seated state, the average temperature detected by the temperature sensor is not constant, but fluctuates. In other words, the user in the seated state is not always seated on the seat motionlessly. The user is operating an external input device, looking into an image on the display unit, or moving his/her hands or head unintentionally. That is why the average temperature detected by the temperature sensor fluctuates. The same reasoning applies to the case where the user is leaning against the seat back. While the user is leaning against the seat back, the user sometimes moves hands or head unintentionally. Further, the average temperature becomes higher, when the user returns to the seated state in general in looking into the screen of the display unit or operating the external input device (hereinafter, referred to as general seated state) from a state of leaning against the seat back.

Therefore, when the average temperatures of the sections L1 to L4 in FIG. 1 become lower than the other sections, there is a possibility that the user leaves the seat and is away from the seat. However, even if the average temperature decreases, when the average temperature fluctuates, it is possible to predict that the user is seated and leaning against the seat back.

However, for example, in a case where someone else is passing behind the user while the user is present or someone else is passing behind the user's seat back while the user is absent, the average temperature detected by the temperature sensor may fluctuate due to the living body temperature of someone else who passes by.

Therefore, the average temperatures of the sections L1 to L4 in FIG. 1 are lower than the other sections, and the fluctuation caused by someone else who passes by is excluded, and then whether or not the average temperature fluctuates, that is whether or not the fluctuation is caused by the user is determined, so that it is made possible to determine whether or not the user is in the state of absence more precisely.

(Embodiments)

Next, some embodiments of the present disclosure will be described.

Figure 3:
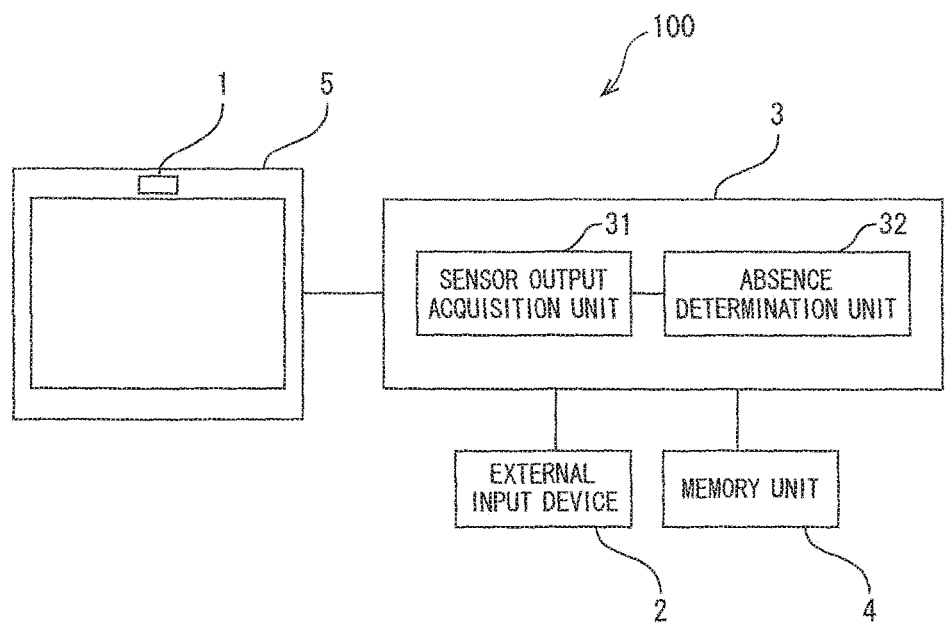
FIG. 3 is a schematic configuration view illustrative of an example of the terminal device to which some embodiments of the present disclosure are applied.

FIG. 3 is a schematic configuration view illustrative of an example of a terminal device to which a living body detector in one embodiment of the present disclosure is applied.

A terminal device 100 includes, as illustrated in FIG. 3, a temperature sensor 1, an external input device 2, an operation processing unit 3, a memory unit 4, and a display unit 5.

The temperature sensor 1 is arranged at, for example, an upper part of the display unit 5, as described above, such that the user's existing position when the user is operating the external input device 2 such as a mouse or keyboard, that is the user who is in the general seated state is included in the visual field.

It is to be noted that herein the case where one temperature sensor is provided at the display unit 5 has been described. However, in another embodiment of the present disclosure, plural temperature sensors can be provided. The provision of plural temperature sensors enables the detection of a temperature change in the visual field of a wider range. It is therefore possible to acquire the temperature change around the terminal device 100 with higher accuracy. Hence, it is possible to suppose the presence or absence of the user of the terminal device 100 more appropriately.

The arranged location of the temperature sensor 1 is not limited to the display unit 5. For example, the temperature sensor 1 may be arranged at the main body of the terminal device. In short, the temperature sensor 1 may be arranged at any location to be capable of measuring the temperature change caused by a change in the distance between the terminal device 100 and the user who is seated facing the terminal device 100 or who is present within a range where the terminal device 100 is available.

The operation processing unit 3 performs an operation process of detecting whether the user is present in front of the display unit 5 or in proximity of the external input device 2 based on a temperature sensor output value of the temperature sensor 1. Then, in response to the state of presence or absence of the user, the operation processing unit 3 performs a screen display on the display unit 5 or an operation in a power-saving mode of lowering the screen brightness or the like. The operation processing unit 3 also performs a predefined process in response to an input operation on the external input device 2, and performs a process of displaying the process result on the display unit 5.

The operation processing unit 3, to be specific, includes a sensor output acquisition unit 31 configured to acquire a temperature sensor output value of the temperature sensor 1, and an absence determination unit 32 configured to make a absence determination based on the temperature sensor output value acquired by the sensor output acquisition unit 31.

The sensor output acquisition unit 31 is configured to read a temperature sensor output value S from the temperature sensor 1 on a constant cycle, and to store the temperature sensor output value S that has been read in the memory unit 4. The absence determination unit 32 is configured to operate a DC output Sdc which is a direct current component of the temperature sensor output value S per a certain period of time based on the temperature sensor output value S stored in the memory unit 4. The absence determination unit 32 is configured to determine that there is a possibility that the user leaves the seat and is away from the seat, when the operated DC output Sdc is lower than a predefined DC output threshold THdc, and to determine whether or not the user leaves the seat and is away from the seat based on a fluctuation of the temperature sensor output value S to be input subsequently.

It is to be noted that instead of a comparison between the DC output Sdc and the DC output threshold THdc, the absence possibility of the user may be determined by comparing the temperature sensor output value S with its threshold.

The memory unit 4 stores a processing program of the operation process for detecting the presence or absence of the user in the terminal device 100, a processing program for various operations, the temperature sensor output value S of the temperature sensor 1 used for the operation, and various types of information such as a threshold for absence determination.

Figure 4:
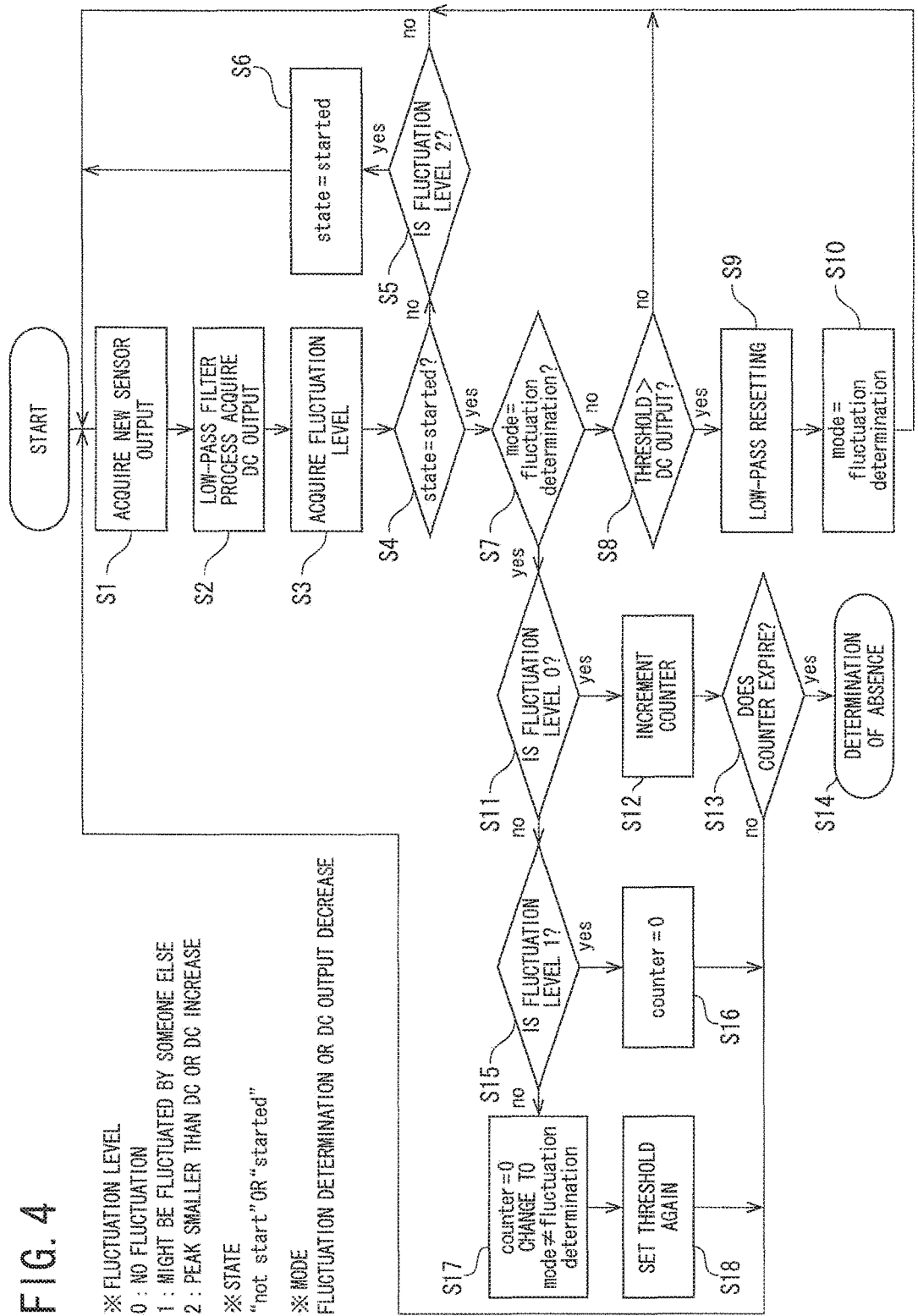
FIG. 4 is a flowchart illustrative of an example of a process procedure for determining an absence.

Next, an example of a process procedure for making a absence determination based on a detection signal of the temperature sensor 1 in the operation processing unit 3 will be described with reference to a flowchart illustrated in FIG. 4.

When the temperature sensor output value S of the temperature sensor 1 is input into the operation processing unit 3 (in step S1), the temperature sensor output value S is subjected to a low-pass filter process, and the processed result is stored in the memory unit 4 as the direct current output Sdc which is the direct current component of the temperature sensor output value S at a current sampling timing. In addition, the temperature sensor output value S is also stored in the memory unit 4 in association with the current sampling timing (in step S2). In this situation, in one embodiment of the present disclosure, the cutoff of the low-pass filter is smaller by one or more digit than a frequency component (typically, about 0.1 Hz to 1 Hz) of a changing waveform generated by the user's movements.

Subsequently, the process goes to step S3, and a fluctuation level is acquired. This fluctuation level is configured to represent whether or not the temperature sensor output value S fluctuates, whether or not the temperature change in the temperature sensor output value S is caused by someone else who passes by, or whether or not the temperature change is caused by the user present in front of the terminal device 100.

This fluctuation level is determined in such a manner that a process frame is set to be a predefined unit time, for example, 10 seconds, and the determination is made based on a changing situation of the temperature sensor output value in the process frame. In one embodiment of the present disclosure, the size of the process frame is larger than a time scale of the changing waveform generated by the user's movement (for example, longer than one second).

Figure 5:
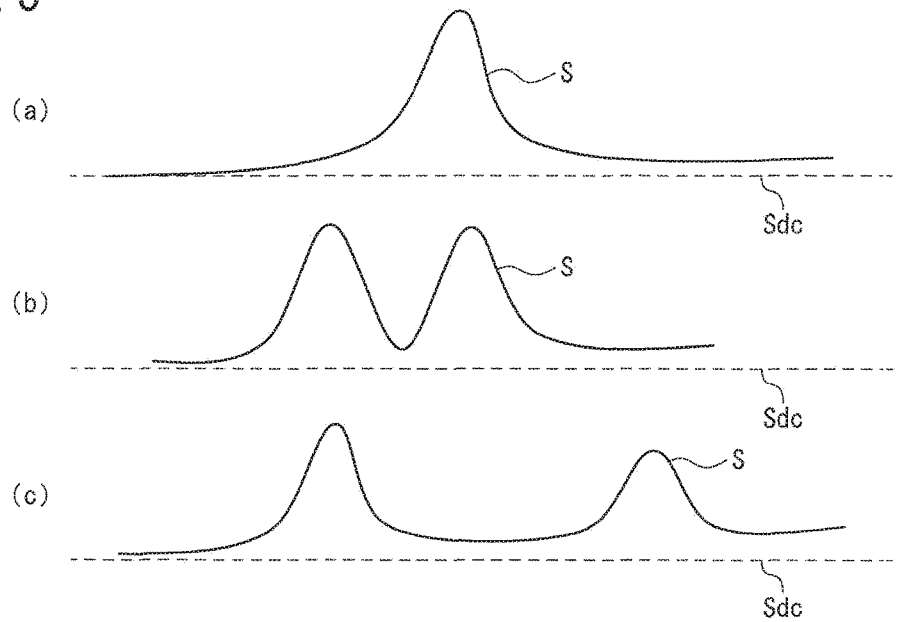

For example, as illustrated in FIG. 5, the temperature sensor output value S changes only in the region larger than DC output Sdc which is a direct current component of the temperature sensor output value S. In other words, when a peak value of the temperature sensor output value S in the process frame is larger than the DC output Sdc which is a direct current component of the temperature sensor output value S, it is determined that the temperature change is caused by someone who passes by.

The DC output Sdc which is a direct current component of the temperature sensor output value S may be detected by performing the low-pass filter process on the temperature sensor output value S in the process frame. In other words, from the temperature sensor output values S stored in the memory unit 4, the temperature sensor output values S corresponding to the process frame, that is the temperature sensor output values S in a predefined period are taken out from the latest ones. By performing the low-pass filter process on the temperature sensor output value S corresponding to the process frame that have been taken out, the DC output Sdc in the process frame is operated.

Herein, when a temperature change caused by someone who passes by occurs, the temperature in the visual field of the temperature sensor 1 temporarily increases according to someone who passes by, and then returns to a state before the change. That is to say, the peak of the temperature sensor output value S is larger than the DC output Sdc of the temperature sensor output value S.

Thus, as illustrated in FIG. 5, when the peak value of the temperature sensor output value S is larger than the DC output Sdc, it is determined that the temperature change is caused by someone who passes by. For example, it can be predicted that one person passed by in (a) of FIG. 5, and two persons passed by in (b) of FIG. 5 and (c) of FIG. 5. Further, it can be predicted that two persons passed by in (b) of FIG. 5 in a shorter period than (c) of FIG. 5.

Figure 6:
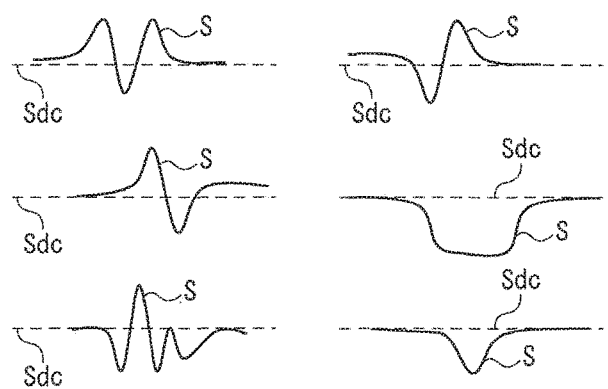
FIG. 6 illustrates an example of the fluctuation pattern in the temperature sensor output value caused by a user of the terminal device.

On the other hand, as illustrated in FIG. 6, after the peak value of the temperature sensor output value S becomes smaller than the DC output Sdc, when it recovers to near the DC output Sdc, it is determined that the temperature change is caused by the user of the terminal device 100.

In other words, when someone else passes in the visual field, the temperature in the visual field temporarily increases, and then it returns to a state before the change. Thus, the temperature sensor output value S does not change in a pattern that the peak value of the temperature sensor output value S becomes smaller than the DC output Sdc and then it recovers to near the DC output Sdc. Besides, as the temperature sensor output value S represents the average temperature in the visual field, the decrease in the temperature sensor output value S means that a heating element, namely a human in the visual field moves away from the temperature sensor 1. Furthermore, the temperature sensor output value S decreases and then returns to a state before the change, which means that after a human being moves away from the temperature sensor 1 and then comes closer again. In other words, this means that before and after the temperature sensor output value S changes, a human, namely a user is present.

Thus, when the temperature sensor output value S changes in the pattern that the peak value of the temperature sensor output value S becomes smaller than the DC output Sdc and then it recovers to near the DC output Sdc, the temperature change caused by the user can be considered, in other words, the user being present can be considered.

Accordingly, as illustrated in FIG. 6, when the peak value of the temperature sensor output value S becomes smaller than DC output Sdc and then it recovers to near the DC output Sdc, in other words, when the peak value of the temperature sensor output value S is smaller than DC output Sdc, it is determined that the temperature change is caused by the user of the terminal device 100.

Figure 7:
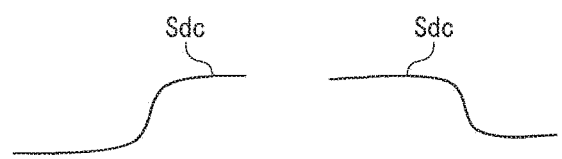
FIG. 7 illustrates an example of the fluctuation pattern in the temperature sensor output value caused by a user of the terminal device.

In addition, for example, as illustrated in FIG. 7, when the DC output Sdc which is a direct current component of the temperature sensor output value S increases or decreases comparatively steeply, the temperature change caused by the user can be considered. In other words, when someone else passes in the visual field, as described above, the temperature temporarily increases and it returns to a state before the change. Thus, the DC output Sdc does not change that much according to someone else who passes by. In other words, when the DC output Sdc changes in the pattern as illustrated in FIG. 7, the temperature change caused by the user cannot be considered.

However, when the DC output Sdc increases by a certain variation range, it can be considered that the user is present. Even if the DC output Sdc decreases by a certain variation range, the user is not always present and the user might leave the seat and be away from the seat. Therefore, herein, only when the DC output Sdc increases, the temperature change caused by the user is considered, whereas when the DC output Sdc decreases, the temperature change caused by the user is not considered.

It is to be noted that the DC output Sdc increases, also when someone else stops for a long time without sitting on the seat. In this case, although the user is not seated, someone else is standing near the terminal device 100. This means that the use of the terminal device 100 or looking into the screen can be predicted.

Figure 8:
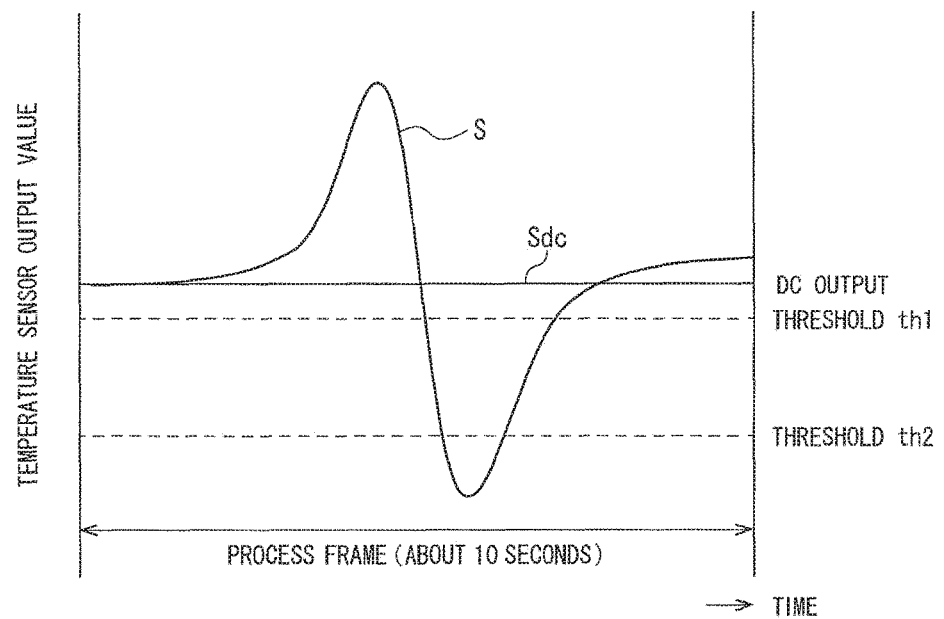
FIG. 8 is a view illustrative of a method of determining a cause of fluctuation.

Hence, it would be no problem to determine that a temperature change caused by the user occurs, that is, the user is present. Then, the determination on whether or not the temperature sensor output value S changes as illustrated in FIG. 5 to FIG. 7 is made in every one of the above-mentioned process frames. For example, as illustrated in FIG. 8, the peak value of the temperature sensor output value S is smaller than DC output Sdc, and then the determination on whether or not the temperature sensor output value S has recovered to near the DC output Sdc is made as follows.

That is, a predefined unit time (for example, about 10 seconds) is set to be a process frame, a first threshold th1 is set by a value smaller by only a predefined difference temperature than the DC output Sdc in the process frame, and a second threshold th2 is set by a value smaller by only a predefined difference temperature than the first threshold th1. It is to be noted that the difference temperature used to set the first threshold th1 and the difference temperature used to set the second threshold th2 are set to values that can be considered that the seated user clearly moves his/her body back and forth from a changing pattern of the temperature sensor output value S based on the first threshold th1 and the second threshold th2 to be set according to the difference temperature. It is to be noted that, in one embodiment of the present disclosure, the first threshold th1 is set to a value larger than a value of the second threshold th2 and closer to the DC output Sdc, but the first threshold th1 may have a value smaller than the second threshold th2. Also, the first threshold th1 may have a same value with the second threshold th2.

Then, the peak value of the temperature sensor output value S in the process frame is calculated, and in addition, the direct current component of the temperature sensor output value S in the process frame is calculated as the DC output Sdc in the low-pass filter process, so that the determination may be made from a large/small relation of upper and lower peak values, and the first threshold th1 and the second threshold th2.

It is to be noted that the fluctuation level may be acquired in the unit of the process frame whenever the temperature sensor output value S is acquired, or may be acquired at every predefined unit time.

Then, as to the changing situation of the temperature sensor output value S, as illustrated in FIG. 5, when the peak value of the temperature sensor output value S is larger than the DC output Sdc and it is determined that the temperature change is caused by someone who passes by, the fluctuation level is set to "1". Additionally, as to the changing situation of the temperature sensor output value, as illustrated in FIG. 6, when the peak value of the temperature sensor output value S is smaller than DC output Sdc and the temperature sensor output value S recovers to near the DC output Sdc, or, as illustrated in FIG. 7, when the DC output Sdc increases by equal to or more than a predefined increase range, it is determined that the temperature change is caused by the user, and the fluctuation level is set to "2".

Further, when there is no fluctuation in the temperature sensor output value S, when there is a fluctuation, but does not correspond to either FIG. 5 or FIG. 6, or when the DC output Sdc decreases, as illustrated in FIG. 7, in other words, when neither the temperature change caused by the user nor the temperature change caused by someone else who passes by is determined, the fluctuation level is set to "0".

In this way, after the fluctuation level is acquired, the process goes from step S3 to step S4, and then whether or not a state variable "state" is set to "started" is determined. It is to be noted that this state variable "state" is set to "not start" when the terminal device 100 is powered on.

Then, when "state=started" is not set, the process goes from step S4 to step S5, it is determined that whether the fluctuation level determined in step S3 is "2".

When the fluctuation level is "0" or "1", that is when the temperature sensor output value does not fluctuate, or when it is determined that the temperature change caused by someone else who passes by, the process returns to step S1 to acquire a new temperature sensor output value S at the next sampling timing.

On the other hand, when the fluctuation level determined in step S3 is set to "2", the process goes from step S5 to step S6 and sets the state variable "state" to "state=started". Then, the process returns to step S1 and a new sensor output is acquired at the next sampling timing.

In other words, even if the terminal device 100 is powered on, when it takes time for the terminal device 100 to be up, or when the terminal device 100 is powered on by a host device, the user might not always be seated when the terminal device 100 is up. The absence determination does not have to be made when the user is not seated. For this reason, until the fluctuation level is set to "2" after the terminal device 100 is powered on, that is, while the presence of the user in front of the terminal device 100 is not determined, the absence determination process of step S7 or later is not performed. Then, when the fluctuation level is set to "2" and the presence of the user in front of the terminal device 100 is detected, subsequently, the absence determination process of step S7 or later is to be performed.

When "state=started" is determined in step S4, the process goes from step S4 to step S7, and then whether or not a mode variable "mode" is set to "mode=fluctuation determination" is determined. Then, when "mode=DC output decrease" is set, the process goes from step S7 to step S8, and whether or not the DC output Sdc acquired in step S2 is smaller than the DC output threshold THdc for determining whether or not the fluctuation determination is to be made. When the DC output Sdc is equal to or larger than the DC output threshold THdc, the process returns to step S1 without change. When the DC output Sdc is smaller than the DC output threshold THdc, the process goes to step S9 for low-pass resetting.

In other words, by doing the low-pass resetting, instead of using the temperature sensor output value S corresponding to the process frame from the latest temperature sensor output values S stored in the memory unit 4, as the temperature sensor output value S corresponding to the process frame to be used for the operation of the DC output Sdc, the temperature sensor output values S of the current moment or later are configured to be used. The temperature sensor output values S acquired before the current time point are not used for the operation of the DC output Sdc.

Then, the process goes to step S10, and the mode variable "mode" is set to "mode=fluctuation determination". Then, the process returns to step S1, the temperature sensor output value S is newly acquired, and the low-pass filter process is performed (step S2).

In this case, since the low-pass resetting is done in step S9, in the case of performing the low-pass filter process, the low-pass filter process is performed based on the temperature sensor output values S of the time point when or after the DC output Sdc becomes smaller than the DC output threshold THdc.

Herein, the DC output threshold THdc is a reference value for determining whether or not a user is present in front of the terminal device 100. An initial value is set beforehand for the DC output threshold THdc, and is to be updated by the process in step S18 to be described later. The initial value of the DC output threshold THdc is set to a value that can be considered that the user is apparently present and seated in front of the terminal device 100, for example, based on the DC output Sdc. For example, the initial value is set based on the DC output Sdc of the state where a user is in a seated state in a general sitting manner in front of the terminal device 100.

It is to be noted that when the initial value of the DC output Sdc is not limited to a fixed value set beforehand, and may be set, for example, depending on an ambient temperature of the terminal device 100. In other words, a correspondence between a general value of the DC output Sdc when a user is seated facing the terminal device 100 and the temperature environment of the terminal device 100 is set beforehand. Then, after the terminal device 100 is powered on, the ambient temperature may be detected, a general value of the DC output Sdc corresponding to the ambient temperature may be calculated, and a value lower by a predefined difference value than the general value of the DC output Sdc may be set to the initial value of the DC output threshold THdc.

In other words, in the processes of step S7 to step S10, the following operations are performed.

That is, when the DC output Sdc is equal to or larger than the DC output threshold THdc, it can be considered that the user is seated in front of the terminal device 100. When the user is present, there is no need for the absence determination. On the other hand, when the DC output Sdc is smaller than the DC output threshold THdc, no user might be present in front of the terminal device 100, and the absence determination is to be performed. Therefore, when the DC output Sdc is smaller than the DC output threshold THdc, the mode variable "mode" is set to "mode=fluctuation determination", and the absence determination after step S11 is performed.

When "mode=fluctuation determination" is set in the process of step S10, the process goes from step S7 to step S11. When "0" is set as the fluctuation level, the process goes to step S12 and an absence determination counter is incremented. It is to be noted that the absence determination counter is set to zero when the terminal device 100 is powered on. Also, the upper limit of the absence determination counter is set to a value that can be considered that the user leaves the seat and is away from the seat (for example, about 100 seconds), since a state where no fluctuation occurring at the temperature sensor output value S continues.

Subsequently, the process goes to step S13. When the absence determination counter does not expire, that is, when the count value does not reach the upper limit that is set beforehand, the process returns to step S1 without change. When the count value reaches the upper limit, the process goes to step S14, and the absence is determined. Then, for example, a process in the case of the absence determination is performed such as lowering of the brightness of the display unit.

When "1" is set as the fluctuation level, the process goes through step S15 from step S11 to step S16, and the absence determination counter is reset to zero. Then, the process returns to step S1.

When "2" is set as the fluctuation level, the process goes from step S15 to step S17, and the absence determination counter is reset to zero. In addition, the mode variable is changed to "mode≠fluctuation determination" (that is, "mode=DC output decrease"). Then, the process goes to step S18, and after the DC output threshold THdc is set again, the process returns to step S1.

In other words, as the DC output Sdc is smaller than the DC output threshold THdc at this time point, the user might be in the state of absence, but, the fluctuation level is set for "2". Hence, it is possible to estimate that the user is present in front of the terminal device 100. That is, as illustrated in FIG. 2A, while the user is seated and leaning against the seat back, the temperature sensor 1 is spaced apart from the user as compared to the general seated state. Thus, the temperature sensor output value S becomes smaller than the general value, and the DC output Sdc is smaller than the DC output threshold THdc, in some cases.

Therefore, in such cases, the state of presence or absence is to be determined with a reference value of the DC output Sdc in the state where the user is seated and leaning against the seat back. Therefore, the DC output threshold THdc is set again based on the DC output Sdc after the presence of the user is determined. It is to be noted that as to the re-set value of the DC output threshold THdc, the DC output threshold THdc may be set by the value in which the predefined difference value based on the DC output Sdc when the presence of the user is determined is subtracted, or may be set as a function of the DC output Sdc sequentially operated after the presence of the user is determined.

Afterwards, the absence determination is made based on the re-set value of the DC output threshold THdc.

Next, operations in some embodiments of the present disclosure will be described.

Figure 9:
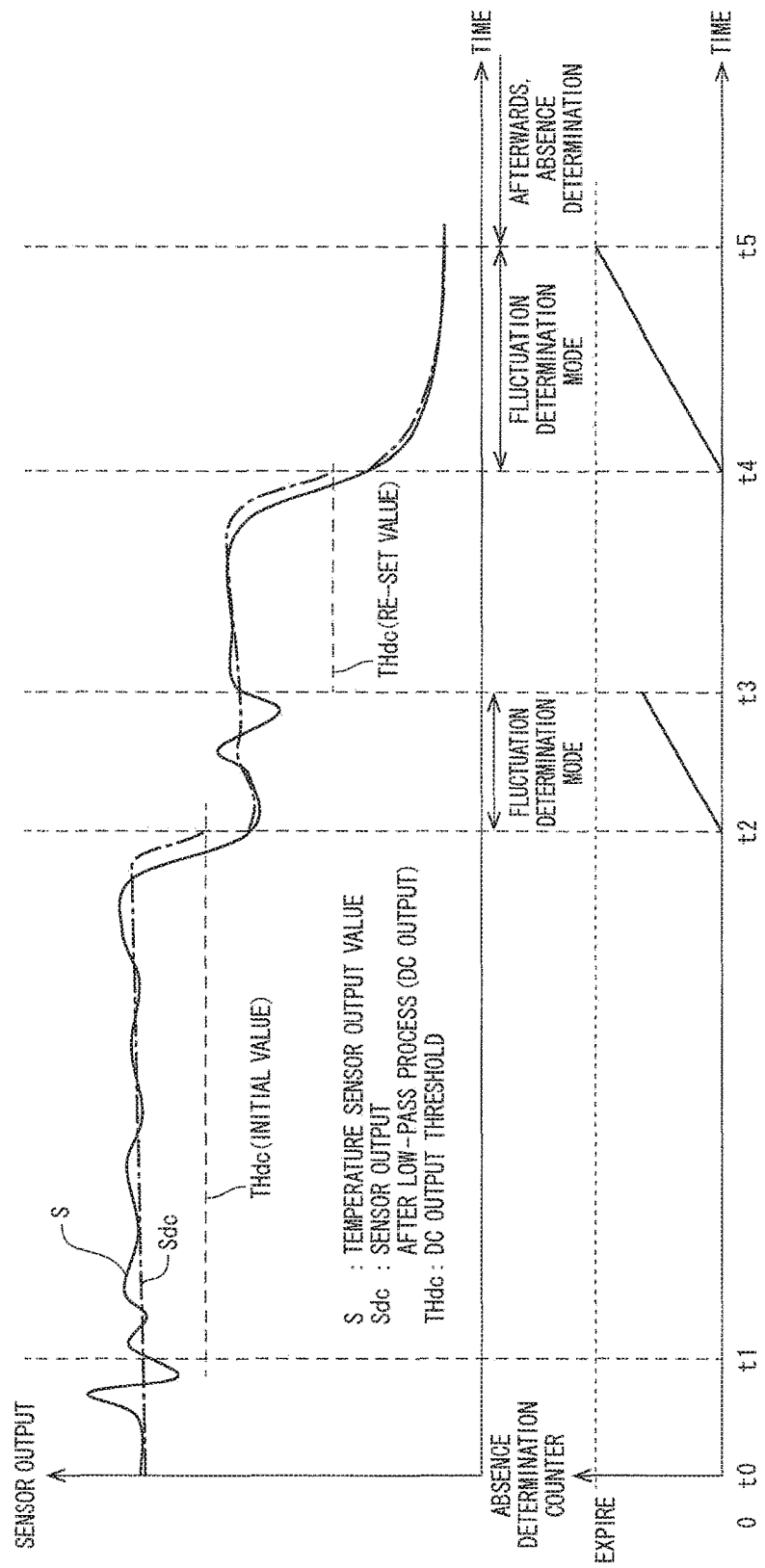
FIG. 9 is a timing chart illustrative of an example in changing situations of various signals to be used for describing the operation in one embodiment of the present disclosure.

FIG. 9 illustrates changing situations of various signals in accordance with a change of the temperature sensor output value of the temperature sensor 1, and illustrates changing situations of a case where the presence state shifts to the absence state.

A user is seated in front of the terminal device 100, and the terminal device 100 is powered on at a time point t0. Then, when the terminal device 100 is up, the operation process illustrated in FIG. 4 starts, the low-pass filter process is performed based on the temperature sensor output value S of the temperature sensor 1, and the DC output Sdc is operated. In addition, the fluctuation level is set from a large/small relation of the temperature sensor output value S and the peak value of the DC output Sdc.

Figure 2B:
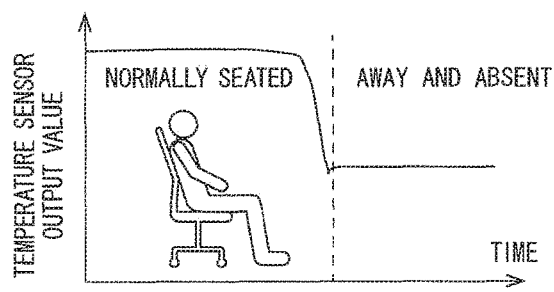

When the user is in the general seated state as illustrated in FIG. 2A and FIG. 2B and a relatively fixed distance is kept between the temperature sensor 1 and the user, the temperature sensor output value S and the DC output Sdc roughly conform to each other. Hence, the fluctuation level is set to "0". However, when the user is seated and moving his/her body back and forth, the temperature sensor output value S temporarily decreases in accordance with a change in the distance between the temperature sensor 1 and the user as illustrated in FIG. 9, and then it recovers. Hence, the peak value of the temperature sensor output value S becomes smaller than the DC output Sdc.

For this reason, as the fluctuation level is set to "2" at a time point t1 and the determination is made such that there is a possibility that the user is present in front of the terminal device 100, the state variable is set to "state=started" (in step S6).

In addition, since the fluctuation level is "2", the process goes from step S7 to step S8. However, the DC output Sdc is not smaller than the DC output threshold THdc (i.e., initial value), and thus the absence determination does not have to be made. Therefore, the processes of step S1 to step S5 are repeated.

It is to be noted that the fluctuation level is set based on the temperature sensor output value S and the DC output Sdc. Therefore, when the determination is made at the time point t1 such that the user is present, the low-pass filter may be reset so that the DC output Sdc may be operated based on the temperature sensor output value S of the time point when or after it is determined that the user is present.

From such a state, when the user leans against the seat back as illustrated in FIG. 2A and FIG. 2B, the distance between the user and the temperature sensor 1 becomes longer. Thus, the temperature sensor output value S decreases. When the DC output Sdc becomes smaller than the DC output threshold THdc (i.e., initial value) at a time point t2, the process goes from step S8 to step S9, and the low-pass resetting is done. The mode variable "mode=fluctuation determination" is set. Also, the low-pass process is newly performed based on the temperature sensor output value S of the time when and after the time point t2, and the operation of the DC output Sdc of the temperature sensor output value S starts.

At the time point t2 when the DC output Sdc becomes smaller than the DC output threshold THdc (i.e., initial value), the temperature sensor output value S decreases. Hence, it is understood that the distance between the user in the visual field and the temperature sensor 1 becomes longer, but whether or not the user is away from the seat is unknown.

Therefore, the absence determination of the user is not made at this time point.

Then, while the user is leaning against the seat back and keeping quiet, the temperature sensor output value S gently changes and the fluctuation level is set to "0". Thus, the process goes from step S11 to step S12, and the absence determination counter is incremented. While the user is keeping relatively quiet and the fluctuation level is set to "0", the absence determination counter is incremented and the counting value increases.

The user moves his/her body back and forth from this state, and the temperature sensor output value S becomes smaller than the DC output Sdc. After that, when the temperature sensor output value S returns to near the DC output Sdc, the fluctuation level is determined to be "2" at a time point t3. Therefore, the process goes from step S17 to step S18, the absence determination counter is reset, and the mode variable is set to "mode≠fluctuation determination". At the same time, the DC output threshold THdc is set again based on the DC output Sdc of the time point t3. Therefore, this time the re-set value of the DC output threshold THdc and the DC output Sdc are compared.

In other words, at the time point t2 when the DC output Sdc becomes smaller than the DC output threshold THdc, whether or not the user is away or present in the visual field is unknown. However, at the time point t3, when the user moves his/her body back and forth, it is possible to determine that the user is present. In addition, the distance between the user and the temperature sensor 1 becomes longer than the distance between the user and the temperature sensor 1 at the time point t1. Hence, at the time point t3, the DC output threshold THdc is set again based on the DC output Sdc of the time point when the presence of the user is determined, and this time the absence determination is made based on the re-set value of the DC output threshold THdc. In other words, by determining whether the DC output Sdc of the time point when or after the presence of the user is determined at the time point t3 decreases to some degree, that is by determining whether the distance between the user and the temperature sensor 1 becomes longer, it is made possible to estimate whether there is a possibility that the user is away from the seat.

It is to be noted that when the fluctuation level of "2" is determined at the time point t3, the low-pass filter resetting may be performed at this time point.

As illustrated in FIG. 2A and FIG. 2B, when the user leaves the seat and is away from the seat from the state of leaning against the seat back, the DC output Sdc decreases together with a decrease in the temperature sensor output value S. Then, when the DC output Sdc becomes smaller than the re-set value of the DC output threshold THdc at a time point t4, the mode variable is set to "mode=fluctuation determination". Then, the temperature sensor output value S gradually decreases without a fluctuation, since the user leaves the seat. The fluctuation level is set to "0". Then, the process goes from step S11 to step S12, and the absence determination counter is incremented. When the absence determination counter reaches the upper limit at a time point t5, the process goes from step S13 to step S14 and the state of absence is determined. The process subsequent to the determination of the state of absence such as an adjustment of brightness of the display unit 5 is performed.

In other words, the distance between the user and the temperature sensor 1 of the time point 3 when the presence of the user is determined becoming further longer is detected at the time point t4, and after the time point t4, when the state of the fluctuation level of "0" continues and the situation where the presence of the user cannot be determined continues for a certain period of time (i.e., for a period corresponding to the upper limit of the absence determination counter), it can be considered that the user is away from the seat. At this time point, the absence is determined.

Figure 10:
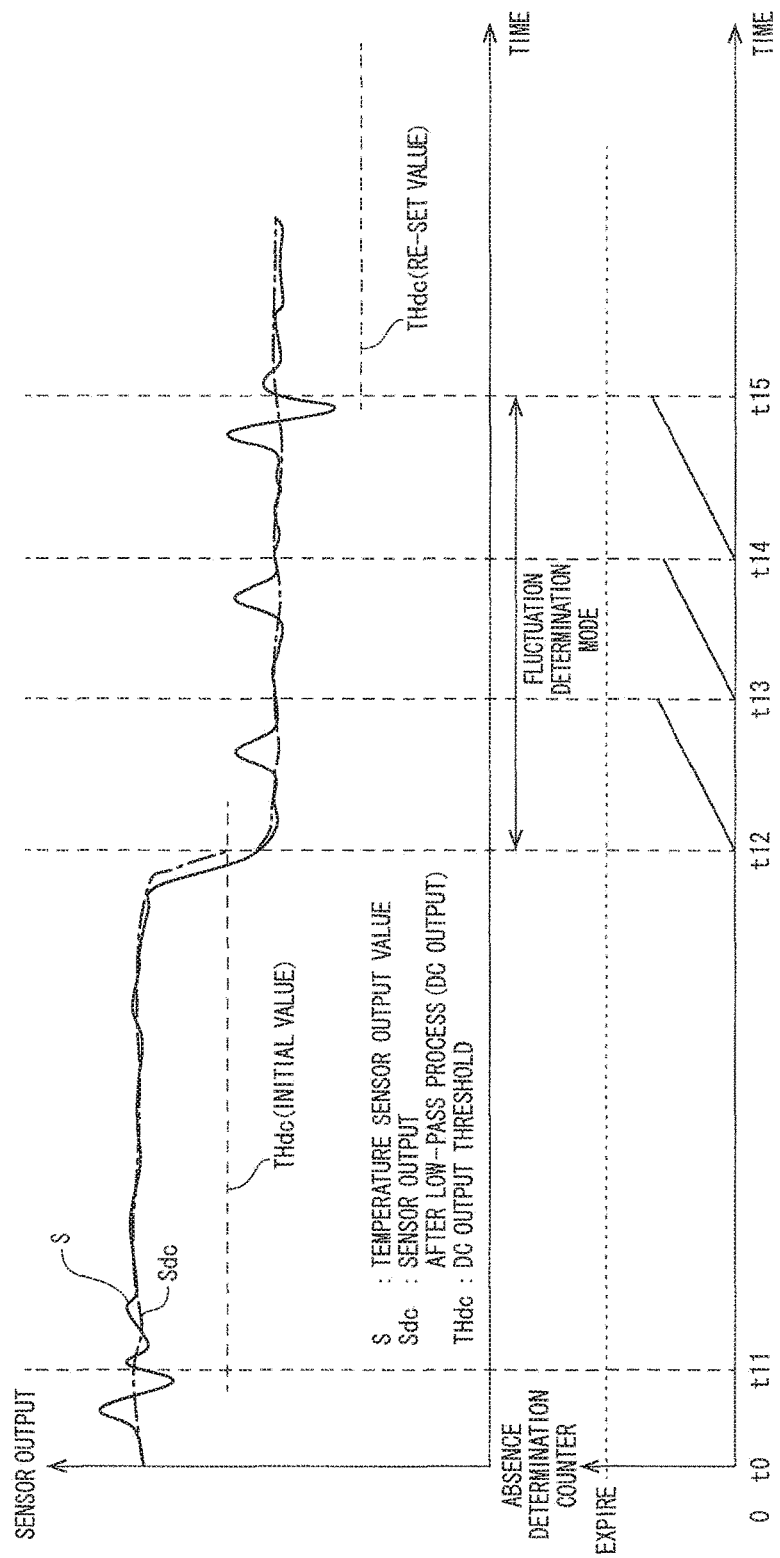
FIG. 10 is a timing chart illustrative of an example in changing situations of various signals to be used for describing the operation in one embodiment of the present disclosure.

FIG. 10 illustrates a changing situation of various signals in accordance with a change in the temperature sensor output value of the temperature sensor 1, and illustrates a changing situation when someone else who passes behind the user who is seated.

As illustrated in FIG. 10, the user powers on the terminal device 100 at the time point t0. When the presence of the user in front of the terminal device 100 is detected at the time point t11, the DC output Sdc and the DC output threshold THdc (i.e., initial value) are compared. Then, for example, when the user gets into the state of leaning against the seat back, the temperature sensor output value S decreases, and the DC output Sdc decreases, accordingly. At a time point t12, when the DC output Sdc becomes smaller than the DC output threshold THdc (i.e., initial value), the mode variable is set to "mode=fluctuation determination", to determine the fluctuation level based on the large/small relation between the temperature sensor output value S and the DC output Sdc.

While the user is leaning against the seat back and keeping quiet, the temperature sensor output value S changes relatively gently. Thus, the fluctuation level is set to "0", and the absence determination counter is incremented.

From this state, when someone else passes by, the temperature sensor output value S temporarily increases due to someone who passes in the visual field of the temperature sensor 1.

Therefore, it is determined that a temperature change occurs at the temperature sensor output value S caused by someone who passes by. When the fluctuation level is set to "1" at the time point t13, the process goes from step S15 to step S16 of FIG. 4 and the absence determination counter is reset to zero. Then, someone else passes by again, and when the fluctuation level is set to "1" at a time point t14, the absence determination counter is reset to zero at this time point.

From this state, when the user is leaning against the seat back and moving back and forth, the peak value of the temperature sensor output value S is smaller than the DC output threshold THdc, and the temperature sensor output value S recovers to near the DC output threshold THdc, the presence of the user is determined at a time point t15, the fluctuation level is set to "2", and the absence determination counter is reset. Further, the DC output threshold THdc is set again (in step S17 and step S18).

Here, as illustrated at the time points t13 and t14, a fluctuation occurs, and when it is determined that such a fluctuation caused by someone who passes by, the absence determination counter is reset. In other words, even if a fluctuation occurs at the temperature sensor output value S, when it is the fluctuation caused by someone who passes by, whether or not the user is present is not sure. Thus, when it is determined that the fluctuation caused by someone else who passes by, the absence determination counter is reset and the presence of the user is not determined. Only when the fluctuation caused by the user is determined at the time point t15, the presence of the user is determined and the DC output threshold THdc is set again at this time point.

In FIG. 10, if the user leaves the seat at the time point t12, after someone else who passes by is detected at time points t13 and t14, no fluctuation would occur at the temperature sensor output value S after the time point t14, unless someone else passes by. Thus, the fluctuation level "0" is kept, and the increment of the absence determination counter continues accordingly. When the absence determination counter reaches the upper limit, the absence of the user is determined.

Figure 11:
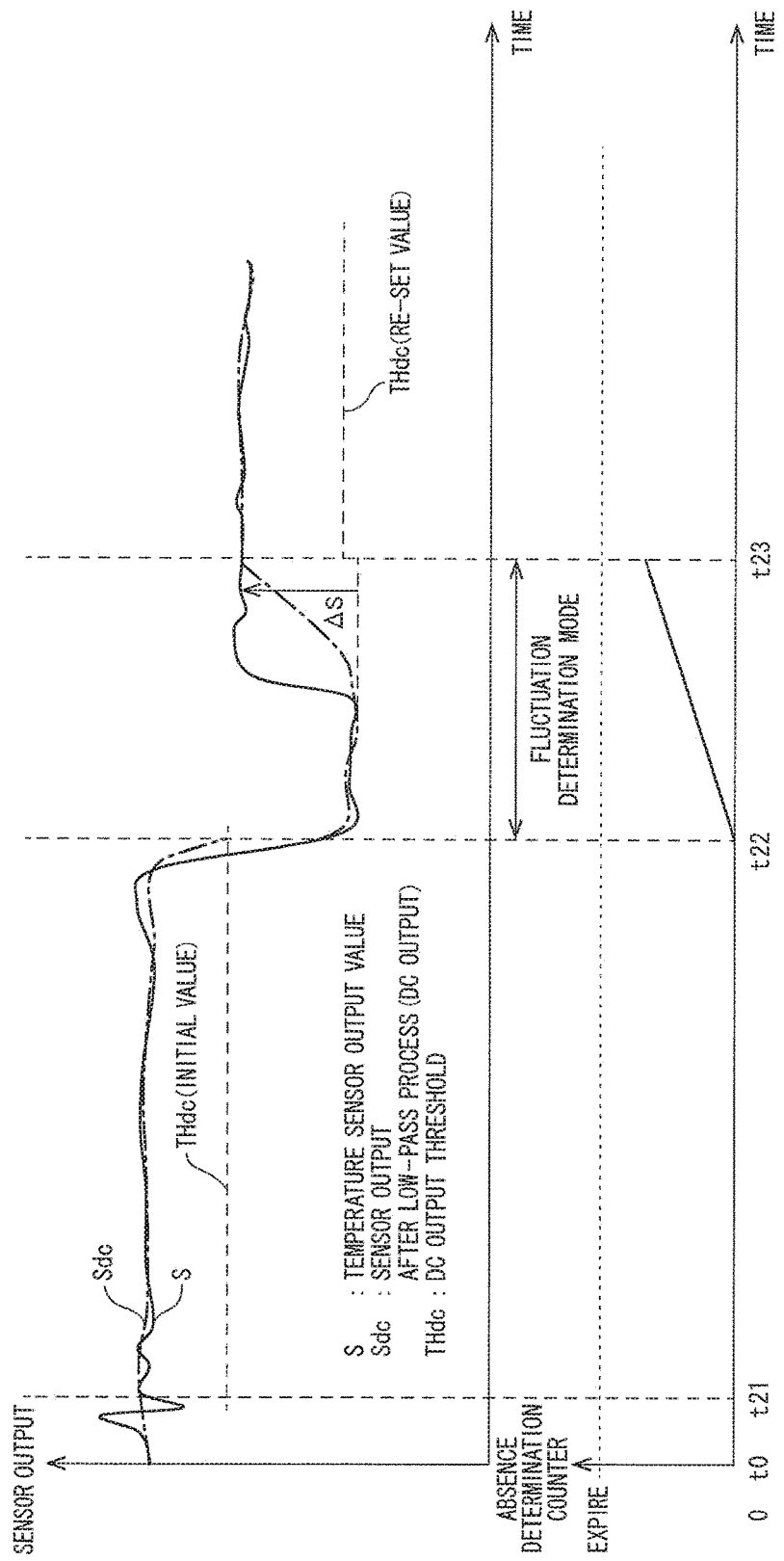
FIG. 11 is a timing chart illustrative of an example in changing situations of various signals to be used for describing the operation in one embodiment of the present disclosure.

FIG. 11 illustrates a changing situation of various signals in accordance with a change in the temperature sensor output value S of the temperature sensor 1, and illustrates a changing situation when the user returns to the general seated state after leaning against the seat back.

As illustrated in FIG. 11, a user powers on the terminal device 100 at the time point t0. When it is determined that the user is present in front of the terminal device 100 at a time point t21, the DC output Sdc and the DC output threshold THdc (i.e., initial value) are compared. Then, the user gets into the state of leaning against the seat back, the temperature sensor output value S decreases, and the DC output Sdc also decreases, accordingly. Then, at the time point t22, when the DC output Sdc becomes smaller than the DC output threshold THdc (i.e., initial value), the mode variant is set to "mode=fluctuation determination", the fluctuation level is determined based on the large/small relation between the temperature sensor output value S and the DC output Sdc.

In this case, the fluctuation caused by the user or the fluctuation caused by someone else who passes by does not occur, the fluctuation level "0" is kept. Therefore, the absence determination counter is incremented. Then, the user returns to the general seated state, the temperature sensor output value S increases accordingly. When the DC output Sdc increases, for example, at a time point t23, when a difference ΔS with a minimum value of the DC output Sdc becomes larger than a predefined difference value, the presence of the user who has brought an increase in the DC output Sdc is determined and the fluctuation level is set to "2", the absence determination counter is reset, accordingly, the DC output threshold THdc is set with reference to the DC output Sdc at the time point t23 (in step S17, step S18), and this time the absence is determined based on the re-set value of the DC output threshold THdc.

As described above, in some embodiments of the present disclosure, whether a fluctuation in the temperature sensor output value caused by the user or someone else who passes by is determined in consideration of not only whether or not the temperature sensor output value S is smaller than the DC output threshold THdc but also a change pattern of the temperature sensor output value S. Although the temperature sensor output value S becomes smaller than the DC output threshold THdc, when a fluctuation occurs, the state of absence is not determined. The state of absence is determined only when there is no fluctuation. Further, when the fluctuation caused by the user occurs while the temperature sensor output value S is smaller than the DC output threshold THdc, the DC output threshold THdc is set again based on the DC output Sdc of this time point. Afterwards, the absence is determined by comparing the re-set value of the DC output threshold THdc and the DC output Sdc. Accordingly, from the general seated state, for example, when the user gets into a state of leaning against the seat back, or the like, it is possible to avoid a wrong absence determination, although the user is seated in fact. In addition, since the absence determination is made by using the re-set value of the DC output threshold THdc, even if the user leaves the seat from the state of being leaning against the seat back, it is possible to detect the absence with certainty.

It is to be noted that herein the description has been given of the case where the user is leaning against the seat back. However, the present disclosure is not limited to the above case. For example, from the general seated state, even when the user is slightly spaced apart from the terminal device 100 in order to look into only the screen of the display unit 5 without performing an input operation by use of the external input device 2, the DC output Sdc decreases. Therefore, the state of absence is not determined when the DC output Sdc becomes smaller than the DC output threshold THdc (i.e., initial value), and the DC output threshold THdc is set again based on the DC output Sdc of the time when the user is slightly spaced apart from the terminal device 100.

For example, from this state, when the user leans against the seat back and the DC output Sdc becomes smaller than the DC output threshold THdc (i.e., re-set value 1) accordingly, the state of absence is not determined at this stage, but the DC output threshold THdc is set again based on the DC output Sdc while the user is leaning against the seat back. In other words, this time, based on the DC output Sdc while the user is leaning against the seat back, the absence determination is made based on the set DC output threshold THdc (i.e., re-set value 2).

Further, from this state, when the user leaves the seat, the absence is determined at a time point and the DC output Sdc is smaller than the re-set value (i.e., re-set value 2) of the DC output threshold THdc and the state where no fluctuation caused by the user or someone else who passes by continues for a certain period.

Thus, since the DC output threshold THdc is sequentially set again based on the DC output Sdc of the time point when the presence of the user is determined, it is possible to set the DC output threshold THdc suited for a current positional relationship between the user seated on a seat and the temperature sensor 1.

Therefore, accuracy in the absence determination can be further improved.

It is to be noted that, in the above embodiments of the present disclosure, the description has been given of the case where the DC output Sdc changes only in the region where the DC output Sdc is larger than the DC output threshold THdc, that is, when the peak value of the temperature sensor output value S in the process frame is larger than the DC output Sdc which is a direct current component of the temperature sensor output value S, it is determined that the temperature changes is caused by someone who passes by, and the absence determination counter is configured to be reset. However, the present disclosure is not limited to this. For example, when the temperature changes due to someone else who passes by, there is no relation with a movement of the user. Hence, instead of resetting the absence determination counter, increment may be continued without change by ignoring a fluctuation caused by the temperature change.

In addition, in the above embodiments of the present disclosure, the case where a living body detector in one embodiment of the present disclosure is mounted on a terminal device has been described. However, the present disclosure is not limited to this. The living body detector in one embodiment of the present disclosure can be mounted on a personal computer or the like. The living body detector in one embodiment of the present disclosure is applicable to any device or apparatus, as far as it is operated by a user who is seated in front of the device, such as a terminal device, in particular, or it is located at a given place from its user while the user is operating the device or apparatus, such as smartphones or mobile telephones.

Further, the present disclosure is not limited to the case where the living body detector in one embodiment of the present disclosure is mounted on a terminal device. For example, a state determination device is configured to include the temperature sensor 1, the sensor output acquisition unit 31, the absence determination unit 32, and the memory unit 4. For example, in the absence determination, the absence may be determined by determining whether or not a user is present in the visual field of the temperature sensor 1.

Further, in the above embodiments of the present disclosure, the description has been given of the case where the living body is detected by use of a temperature sensor. As described above, however, the living body can be detected by use of a distance sensor.

Figure 12:
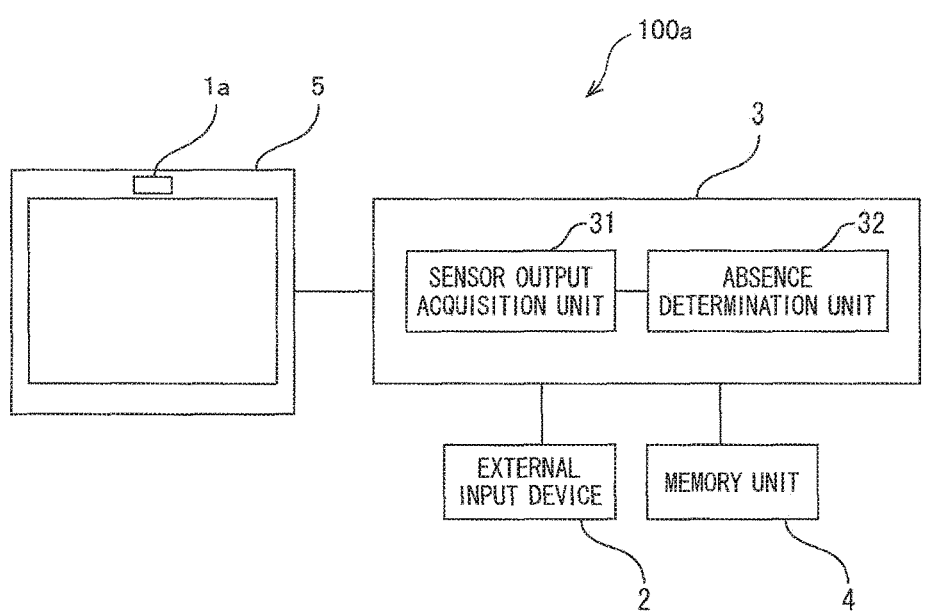
FIG. 12 is a schematic configuration view illustrative of another example of the terminal device to which some embodiments of the present disclosure are applied.

FIG. 12 illustrates an example of a schematic configuration of a terminal device 100a to which a living body detector using a distance sensor is applied. As illustrated in FIG. 12, the terminal device 100a to which the living body detector using the distance sensor is applied includes a distance sensor 1a, the external input device 2, the operation processing unit 3, the memory unit 4, and the display unit 5. The distance sensor 1a is arranged at, for example, an upper part of the display unit 5, in a similar manner to the temperature sensor 1, such that the user's existing position when the user is operating the external input device 2 such as a mouse or keyboard, that is the user who is in the general seated state is included in the visual field. The distance sensor 1a is configured to detect a distance between the user and the distance sensor 1a, and to output a distance sensor output value to the operation processing unit 3.

Then, in the terminal device 100a, the distance sensor output value is replaced with the temperature sensor output value, and the living body may be detected in a similar procedure to the above terminal device 100.

It is to be noted that the scope of the present disclosure is not limited to exemplary embodiments that are illustrated or described, and all embodiments that can bring equivalent effects to which the present disclosure is intended. Further, the scope of the present disclosure can be brought about by any desired combination of specific ones of the respective features that have been described.

Herein, in the above-described embodiments of the present disclosure, the temperature sensor 1 corresponds to a state amount detector, the sensor output acquisition unit 31 corresponds to a sensor signal acquisition unit, a state amount signal acquisition unit, a temperature signal acquisition unit, or a distance signal acquisition unit, and the absence determination unit 32 corresponds to a state determination unit or a living body use signal output unit.

Also, the temperature sensor output value S corresponds to a state amount signal, the DC output Sdc corresponds to a direct current component of the state amount signal, the DC output threshold THdc corresponds to a state amount signal threshold, or a sensor signal threshold, the second threshold th2 corresponds to a first reference value, and the first threshold th1 corresponds to a second reference value.

Also, the DC output Sdc corresponds to an increase/decrease threshold.

Further embodiments of the living body detector that have been described heretofore will be described below.

(Embodiment 1)

An information processing device includes:

a state amount signal acquisition unit configured to acquire a state amount signal output from a state amount detector configured to output at least one of information on an absolute temperature in a visual field or information on a distance to an object present in the visual field;

a state determination unit configured to determine a state of a possible object present in the visual field based on the state amount signal acquired by the state amount signal acquisition unit, wherein a direction where the absolute temperature decreases or the distance gets longer is set to a longer distance direction, and wherein after the state amount signal gets into a state of being found in the long distance direction than a predefined state amount signal threshold, the state determination unit is configured to determine a state of the possible object present in the visual field based on a relationship between a direct current component of the state amount signal after the state amount signal gets into the state of being found in the longer distance direction than the state amount signal threshold and a displacement state in an increase/decrease direction of the state amount signal.

(Embodiment 2)

In the information processing device in the above Embodiment 1, a direction in which the absolute temperature increases or a direction in which the distance gets shorter may be set to a shorter distance direction, a first reference value may be set to a reference value in the longer distance direction than the direct current component of the state amount signal after the state amount signal gets into the state of being found in the longer distance direction than the state amount signal threshold, a second reference value may be set to a predefined reference value, after the state amount signal gets into the state of being found in the longer distance direction than the predefined state amount signal threshold, when the state amount signal changes into a state of being found in the longer distance direction than the first reference value from a state of being found in the shorter distance direction than the first reference value, and then changes into the state of being found in the shorter distance direction than the second reference value from the state being found in the longer distance direction than the second reference value, the state determination unit may be configured to determine that the object is present in the visual field, or to set the state amount signal threshold again based on the state amount signal.

(Embodiment 3)

In the information processing device in the above Embodiment 1, a direction in which the absolute temperature increases or a direction in which the distance gets shorter may be set to a shorter distance direction, after the state amount signal gets into the state of being found in the longer distance direction than a predefined state amount signal threshold, when the state amount signal changes into a state of being found in the longer distance direction than a direct current component of the state amount signal after the state amount signal changes into the state of being found in the longer distance direction than the state amount signal threshold, and immediately after the above state, when the state amount signal changes to be found in the shorter distance direction, the state determination unit may be configured to determine that the object is present in the visual field, or to set the state amount signal threshold again based on the state amount signal.

(Embodiment 4)

In the information processing device in any one of the above Embodiment 1 to Embodiment 3, a direction in which the absolute temperature increases or a direction in which the distance gets shorter may be set to a shorter distance direction, after the state amount signal gets into a state of being found in the longer distance direction than the predefined state amount signal threshold, the state determination unit may be configured to determine the state of the possible object present in the visual field based only on the displacement state of the direct current component of the state amount signal, and the state determination unit may be configured to determine that the object is present in the visual field, only when the direct current component of the state amount signal changes to be found in the shorter distance direction by equal to or larger than a predefined difference range.

(Embodiment 5)

In the information processing device in any one of the above Embodiment 1 to Embodiment 4, the state amount signal threshold may be set based on the direct current component of the state amount signal.

(Embodiment 6)

An information processing device, including:

a state amount signal acquisition unit configured to acquire a state amount signal output from a state amount detector configured to output at least one of information on an absolute temperature in a visual field or information on a distance to an object present in the visual field; and a state determination unit configured to determine that the object is not present in the visual field, wherein when a direction where the absolute temperature decreases or the distance gets longer is set to a longer distance direction, a direction where the absolute temperature increases or the distance gets shorter is set to a shorter distance direction, and the state amount signal acquired by the state amount signal acquisition unit gets into a state of being found in the longer distance direction than a predefined state amount signal threshold and the above state continues for a given period of time, and wherein in displacement states in an increase/decrease direction of the state amount signal in the given period of time, when a displacement state occurs such that the state amount signal changes only in a state of being found in the shorter distance direction than an increase/decrease threshold set beforehand by the state amount signal in accordance with the displacement state, and does not include a change in the state of being found in the longer distance direction than the increase/decrease threshold, the state determination unit is configured to handle the state amount signal that changes in accordance with the displacement state as the state amount signal found in the longer distance direction than the state amount signal threshold.

(Embodiment 7)

In the information processing device in the above Embodiment 6, the increase/decrease threshold may be a value to be set based on the direct current component of the state amount signal after the state amount signal gets into the state of being found in the longer distance direction than the state amount signal threshold.

(Embodiment 8)

A state determination device includes: a state amount detector configured to detect at least one of information on an absolute temperature in a visual field or information on a distance to an object present in the visual field; and the information processing device in any one of the above Embodiment 1 to Embodiment 7.

(Embodiment 9)

In the state determination device in the above Embodiment 8, the state amount detector may be any one of a thermoelectromotive infrared sensor, a conductive infrared sensor, a photoconductive infrared sensor, a photovoltaic infrared sensor, or a distance sensor.

(Embodiment 10)

In the state determination device in the above Embodiment 8 or Embodiment 9, two or more of the state amount detectors may be provided.

In one embodiment of the present disclosure, there is provided a living body detector, comprising: a sensor signal acquisition unit configured to acquire a sensor signal output from at least one of a temperature sensor detecting a temperature in a visual field or a distance sensor detecting a distance to an object present in the visual field; and a state determination unit configured to determine that a living object in the visual field is in a state of being able to use a device, when the sensor signal has a peak in a longer distance direction than a direct current component of the sensor signal, after the sensor signal gets into a state of being found in the longer distance direction than a sensor signal threshold, in a case where the longer distance direction is defined as a direction in which a temperature decreases or a distance gets longer.

In the above-described living body detector, the state determination unit may be configured to determine that the living body in the visual field is in the state of being able to use the device, when the sensor signal does not have the peak in the longer distance direction than the direct current component, after the sensor signal gets into the state of being found in the longer distance direction than the sensor signal threshold.

In the above-described living body detector, in a case where a shorter distance direction is defined as a direction in which the temperature increases or the distance gets shorter, the state determination unit may be configured not to determine that the living body in the visual field is in the state of being able to use the device, when the sensor signal does not have the peak in the longer distance direction than the direct current component, but has the peak in the short distance, after the sensor signal gets into the state of being found in the longer distance direction than the sensor signal threshold.

In the above-described living body detector, in a case where a shorter distance direction is defined as a direction in which the temperature increases or the distance gets shorter, the state determination unit may be configured to determine that the living body in the visual field is in the state of being able to use the device, when the sensor signal changes from a state of being found in the shorter distance direction than a first reference value that is in the longer distance direction than the direct current component into a state of being found in the longer distance direction than the first reference value, and when the sensor signal changes from a state of being found in the longer distance direction than a second reference value to a state of being found in the shorter distance direction than the second reference value, after the sensor signal gets into the state of being found in the longer distance direction than the sensor signal threshold.

In the above-described living body detector, in a case where a shorter distance direction is defined as a direction in which the temperature increases or the distance gets shorter, the state determination unit may be configured to set the sensor signal threshold again based on the sensor signal, when the sensor signal changes from a state of being found in the shorter distance direction than a first reference value that is in the longer distance direction than the direct current component into a state of being found in the longer distance direction than the first reference value, and when the sensor signal changes from a state of being found in the longer distance direction than a second reference value to a state of being found in the shorter distance direction than the second reference value, after the sensor signal gets into the state of being found in the longer distance direction than the sensor signal threshold.

In the above-described living body detector, the state determination unit may be configured to determine that the living body in the visual field is in the state of being able to use the device, when the sensor signal changes from a state of being found in the shorter distance direction than a first reference value into a state of being found in the longer distance direction than the first reference value, and when the sensor signal changes from a state of being found in the longer distance direction than a second reference value to a state of being found in the shorter distance direction than the second reference value.

In the above-described living body detector, the second reference value may be found in the shorter distance direction than the first reference value, and is near the direct current component.

In the above-described living body detector, the second reference value may have a value same as the first reference value.

In the above-described living body detector, in a case where a shorter distance direction is defined as a direction in which the temperature increases or the distance gets shorter, the state determination unit may be configured to determine that the living body in the visual field is in the state of being able to use the device, when the sensor signal gets into a state of being found in the longer distance direction than the direct current component, and then changes to be found in the shorter distance direction, after the sensor signal gets into the state of being found in the longer distance direction than the sensor signal threshold.

In the above-described living body detector, in a case where a shorter distance direction is defined as a direction in which the temperature increases or the distance gets shorter, the state determination unit may be configured to set the sensor signal threshold again based on the sensor signal, when the sensor signal gets into a state of being found in the longer distance direction than the direct current component, and then changes to be found in the shorter distance direction, after the sensor signal gets into the state of being found in the longer distance direction than the sensor signal threshold.

In the above-described living body detector, the state determination unit may be configured to determine that the living body in the visual field is in the state of being able to use the device, when the sensor signal gets into the state of being found in the longer distance direction than the direct current component, and then changes to be found in the shorter distance direction than the direct current component in a given period of time.

In the above-described living body detector, the state determination unit may be configured not to determine that the living body in the visual field is in the state of being able to use the device, unless the sensor signal changes in a given period of time.

In the above-described living body detector, the state determination unit may be configured to determine that the living body in the visual field is not in the state of being able to use the device, unless the sensor signal changes in a given period of time.

In the above-described living body detector, in a case where a shorter distance direction is defined as a direction in which the temperature increases or the distance gets shorter, the state determination unit may be configured to determine that the living body in the visual field is in the state of being able to use the device, when the direct current component changes in the shorter distance direction by equal to or more than a predefined difference range, after the sensor signal gets into the state of being found in the longer distance direction than the sensor signal threshold.

In the above-described living body detector, the sensor signal threshold may take a value to be set based on the direct current component.

In the above-described living body detector, the sensor may be any one of a thermoelectromotive infrared sensor, a conductive infrared sensor, a photoconductive infrared sensor, a photovoltaic infrared sensor, or a distance sensor.

In the above-described living body detector, the sensor signal acquisition unit may be configured to acquire a plurality of the sensor signals.

In the above-described living body detector, the direct current component may be a signal acquired by performing a low-pass filter process on the sensor signal.

In another embodiment of the present disclosure, there is provided a living body detector, comprising: a temperature signal acquisition unit configured to acquire a temperature signal output from a temperature sensor detecting a temperature in a visual field; and a living body use signal output unit configured to output a signal representing that a living body in the visual field is in a state of being able to use a device, when a temperature represented by the temperature signal has a peak lower than a direct current component of the temperature signal, after the temperature represented by the temperature signal is lower than a temperature threshold.

In the above-described living body detector, the living body use signal output unit may be configured to output the signal representing that the living body in the visual field is in the state of being able to use the device, when the temperature represented by the temperature signal has a peak in a given period of time, after the temperature represented by the temperature signal is lower than the temperature threshold.

In the above-described living body detector, the living body use signal output unit may be configured to output the signal representing that the living body in the visual field is not in the state of being able to use the device, when the temperature represented by the temperature signal does not have the peak in a given period of time.

In yet another embodiment of the present disclosure, there is provided a living body detector, comprising: a distance signal acquisition unit configured to acquire a distance signal output from a distance sensor detecting a distance to an object in a visual field; and a living body use signal output unit configured to output a signal representing that a living body in the visual field is in a state of being able to use a device, when a distance represented by the distance signal has a peak longer than a direct current component of the distance signal, after the distance represented by the distance signal is longer than a distance threshold.

In the above-described living body detector, the living body use signal output unit may be configured to output the signal representing that the living body in the visual field is in the state of being able to use the device, when the distance represented by the distance signal has a peak in a given period of time, after the distance represented by the distance signal is longer than the distance threshold.

In the above-described living body detector, the living body use signal output unit may be configured to output the signal representing that the living body in the visual field is not in the state of being able to use the device, when the distance represented by the distance signal does not have the peak in a given period of time.

In further another embodiment of the present disclosure, there is provided a power-saving mode setting method, comprising: determining that a living body in a visual field of a temperature sensor is in a state of being able to use a device, when a temperature represented by a temperature signal has a peak lower than a direct current component of the temperature signal, after the temperature represented by the temperature signal output from the temperature sensor is lower than a temperature threshold; and setting the device in a power-saving mode, when the temperature represented by the temperature signal does not have the peak in a given period of time.

In further another embodiment of the present disclosure, there is provided a power-saving mode setting method, comprising: determining that a living body in a visual field of a distance sensor is in a state of being able to use a device, when a distance represented by a distance signal has a peak longer than a direct current component of the distance signal, after the distance represented by the distance signal output from the distance sensor is longer than a distance threshold; and setting the device in a power-saving mode, when the distance represented by the distance signal does not have the peak in a given period of time.

In one embodiment of the present disclosure, in a case where the longer distance direction is defined as a direction in which the temperature decreases or the distance gets longer, after the sensor signal is found in the longer distance direction than the sensor signal threshold, when the sensor signal has a peak value in the long distance direction than a direct current component of the sensor signal, a living object in the visual field is determined to be in a state of being able to use a device. Therefore, the state of an object can be detected in a more appropriate manner.

REFERENCE SIGNS LIST 1 temperature sensor
1a distance sensor
2 external input device
3 operation processing unit
4 memory unit
5 display unit
31 sensor output acquisition unit
32 absence determination unit
100, 100a terminal device

The invention claimed is:

1. A living body detector, comprising:
 a temperature signal acquisition unit configured to acquire a temperature signal output from a temperature sensor detecting a temperature in a visual field; and
 a living body use signal output unit configured to output a signal representing that a living body in the visual field is in a state where the living body can use a device, when a temperature represented by the temperature signal has a peak lower than a direct current component of the temperature signal, after the temperature represented by the temperature signal is lower than a temperature threshold, the direct current component being acquired by performing a low-pass filter process on the temperature signal.

2. The living body detector according to claim 1, wherein the living body use signal output unit is configured to output the signal representing that the living body in the visual field is in the state where the living body can use the device, when the temperature represented by the temperature signal has a peak within a given period of time, after the temperature represented by the temperature signal is lower than the temperature threshold.

3. The living body detector according to claim 2, wherein the living body use signal output unit is configured to output the signal representing that the living body in the visual field is not in the state where the living body can use the device, when the temperature represented by the temperature signal does not have the peak within a given period of time.

4. A living body detector, comprising:
 a distance signal acquisition unit configured to acquire a distance signal output from a distance sensor detecting a distance to an object in a visual field; and
 a living body use signal output unit configured to output a signal representing that a living body in the visual field is in a state where the living body can use a device, when a distance represented by the distance signal has a peak longer than a direct current component of the distance signal, after the distance represented by the distance signal is longer than a distance threshold, the direct current component being acquired by performing a low-pass filter process on the distance signal.

5. The living body detector according to claim 4, wherein the living body use signal output unit is configured to output the signal representing that the living body in the visual field is in the state where the living body can use the device, when the distance represented by the distance signal has a peak within a given period of time, after the distance represented by the distance signal is longer than the distance threshold.

6. The living body detector according to claim 5, wherein the living body use signal output unit is configured to output the signal representing that the living body in the visual field is not in the state where the living body can use the device, when the distance represented by the distance signal does not have the peak within a given period of time.

7. A power-saving mode setting method, comprising:
 determining that a living body in a visual field of a temperature sensor is in a state where the living body can use a device, when a temperature represented by a temperature signal has a peak lower than a direct current component of the temperature signal, after the temperature represented by the temperature signal output from the temperature sensor is lower than a temperature threshold, the direct current component being acquired by performing a low-pass filter process on the temperature signal; and
 setting the device in a power-saving mode, when the temperature represented by the temperature signal does not have the peak within a given period of time.

8. A power-saving mode setting method, comprising:
 determining that a living body in a visual field of a distance sensor is in a state where the living body can use a device, when a distance represented by a distance signal has a peak longer than a direct current component of the distance signal, after the distance represented by the distance signal output from the distance sensor is longer than a distance threshold, the direct current component being acquired by performing a low-pass filter process on the distance signal; and
 setting the device in a power-saving mode, when the distance represented by the distance signal does not have the peak within a given period of time.

* * * * *